(12) United States Patent
Meeks

(10) Patent No.: US 6,199,660 B1
(45) Date of Patent: Mar. 13, 2001

(54) LADDER STAND STABILIZING DEVICE

(76) Inventor: Paul H. Meeks, 101 Traci Dr., Tallulah, LA (US) 71282

( * ) Notice: Subject to any disclaimer, the term of this patent is extended or adjusted under 35 U.S.C. 154(b) by 0 days.

(21) Appl. No.: 09/336,903

(22) Filed: Jun. 21, 1999

(51) Int. Cl.[7] ................................................. A01M 31/02
(52) U.S. Cl. ............................................ 182/116; 182/187
(58) Field of Search ............................... 182/93, 115, 116, 182/120, 121, 169, 171, 187, 188

(56) References Cited

U.S. PATENT DOCUMENTS

| | | | |
|---|---|---|---|
| 4,552,246 | * | 11/1985 | Thomas .................................. 182/116 |
| 4,579,198 | * | 4/1986 | Lee ..................................... 182/187 X |
| 4,722,420 | * | 2/1988 | Arthurs et al. ...................... 182/116 X |
| 4,742,888 | | 5/1988 | Amacker . |
| 5,009,283 | | 4/1991 | Prejean . |
| 5,064,020 | | 11/1991 | Eagleson . |
| 5,105,908 | | 4/1992 | Freund . |
| 5,234,076 | | 8/1993 | Louk et al. . |
| 5,314,042 | | 5/1994 | Adams . |
| 5,564,524 | | 10/1996 | Thaggard et al. . |
| 5,579,867 | * | 12/1996 | Jarrel ................................. 182/116 X |
| 5,590,738 | | 1/1997 | Hunt et al. . |
| 5,791,436 | | 8/1998 | Talley, Sr. . |

* cited by examiner

Primary Examiner—Daniel P. Stodola

(57) ABSTRACT

A stabilizing device for stabilizing a ladder stand against a tree or post. The stabilizing device includes a first strut having a base member adapted to engage a tree or post and be secured thereto by a flexible strap and a clevis formed at the opposite end of the first strut for securing the first strut to a lower rung of a ladder stand. The stabilizing device includes a second strut pivotally connected to the first strut adjacent the base member and including a clevis for securing the opposite end of the second strut to a rung spaced four or five rungs away from the lower rung of the ladder stand to which the first strut is connected. The struts may include telescoping extension members for varying the effective lengths of the struts. The stabilizing device resists a tendency for a ladder stand to tilt away from a tree or post during an ascent or descent of the ladder stand by a person using same.

18 Claims, 5 Drawing Sheets

LADDER STAND STABILIZING DEVICE

FIELD OF THE INVENTION

The present invention pertains to a ladder stand for attachment to a tree or post and including an improved multiple strut stabilizing device.

BACKGROUND

Portable ladder stands are widely used for hunting purposes and for gaining access to a tree or post at an elevated position thereon. Conventional ladder stands typically include a substantially straight ladder portion with or without a horizontally extending seat or rest portion at the upper end thereof.

A long-standing problem with the use of ladder stands adapted to be attached to a tree trunk or a vertically-extending post pertains to the lack of stability of the ladder stand, particularly when the stand is erected and initially ascended by the user for attachment of the ladder stand to the tree or post at the upper end of the ladder stand, or during final descent from the ladder stand after disconnecting the ladder stand from such tree or post. Accordingly, conventional ladder stands do not provide adequate stability during the initial ascent of or final descent from the ladder and the ladder tends to tilt away from the tree thereby posing the risk of serious injury to a person attempting to climb or descend the ladder.

Efforts to solve the above-mentioned problem with ladder stands have been attempted, including the provision of single rigid strut-like stabilizing devices which are attached to a lower rung of the ladder and to the tree or post against which the ladder stand is being erected. Ladder stands have also been secured to trees or posts by one or more ropes or straps. However, securement of a ladder stand to a tree or post at a lower rung by prior art stabilizing devices has not addressed the problem of instability of the ladder stand during the initial ascent.

The above-mentioned problem is further aggravated by the desire to provide maximum portability and reduced weight of ladder stands, since these structures are often carried long distances through forests or dense vegetation by persons seeking a desirable hunting spot or otherwise requiring the use of a ladder stand in a remote or heavily vegetated location. Accordingly, stabilizing devices for ladder stands should be made as light-in-weight and as easily carriable as possible.

It is to the above-mentioned ends that the present invention has been developed.

SUMMARY OF THE INVENTION

The present invention provides a ladder stand, including an improved stabilizing device therefor. In particular, the ladder stand stabilizing device of the invention is operable to minimize the chance of a ladder stand tilting away from a tree or a post during an initial ascent of the ladder stand and when the ladder stand is otherwise not secured to the tree or post at an upper end of the ladder stand.

In accordance with one important aspect of the present invention a ladder stand stabilizing device is provided which comprises a first strut including a base member which may be secured to a tree or post by a flexible strap or the like and is provided with a clevis type connector for securing the first strut to a lower rung of a ladder stand. The stabilizing device includes a second strut which is also connected at one end to the base member of the first strut, is of a greater length than the first strut and is adapted to be secured to a rung spaced above the rung to which the first strut is secured. In this way, a ladder stand connected to the stabilizing device is stabilized and does not tend to tip away from a tree or post during an initial ascent or final descent and when the ladder stand is otherwise not secured to the tree or post.

In accordance with another aspect of the invention, a multi-strut stabilizing device for a ladder stand is provided which is easy to assemble and disassemble, is fabricated of lightweight tubular strut members and is provided with quick release clevis pins which include retainers to minimize the chance of unwanted disconnection of the struts of the stabilizing device from each other or from the ladder stand. Moreover, the struts may be easily disassembled or folded toward each other for ease of carrying with the ladder stand to and from a hunting or work site.

In accordance with still another aspect of the invention, a multi-strut stabilizing device for a ladder stand is provided which includes telescoping strut members which may be adjusted in accordance with the length of the horizontal standoff portion of the ladder stand and the stabilizing device may be used with ladders or ladder stands which do not have a generally horizontally extending standoff portion.

Those skilled in the art will further appreciate the above-mentioned advantages and superior features of the present invention, together with other important aspects thereof, upon reading the detailed description which follows in conjunction with the drawing.

DETAILED DESCRIPTION OF PREFERRED EMBODIMENTS

Figure 1:
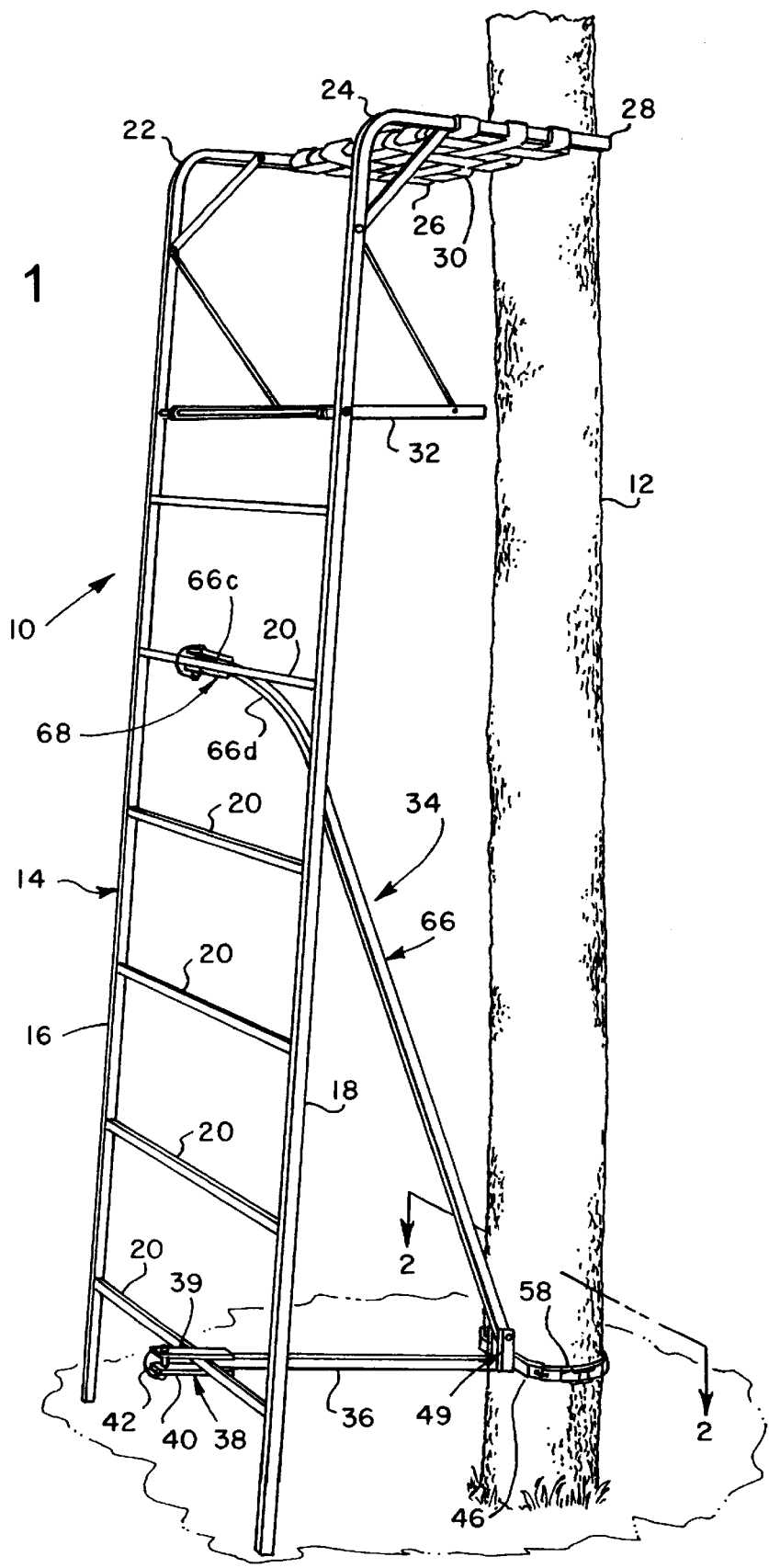
FIG. 1 is a perspective view of a ladder stand including one preferred embodiment of a stabilizing device of the present invention.

In the description which follows, like parts or elements are marked throughout the specification and drawing with the same reference numerals, respectively. The drawing figures are not necessarily to scale and certain features may be shown in somewhat generalized or schematic form in the interest of clarity and conciseness.

Referring to FIG. 1, there is illustrated a ladder stand, generally designated by the numeral 10, of a type typically used by game hunters and observers, for attachment to a vertically extending tree trunk or post to provide a support platform for various purposes. In FIG. 1 the ladder stand 10 is shown connected to a tree trunk 12. The ladder stand 10 includes a ladder section 14 comprising spaced-apart stringers 16 and 18 connected to plural, transverse spaced-apart rungs 20. The stringers 16 and 18 may be provided with upper curved portions 22 and 24 and laterally extending distal ends 26 and 28 between which is supported a seat 30. Suitable means, not shown, such as a flexible strap, may be adapted to secure the distal ends 26 and 28 of the stringers 16 and 18 to the tree 12 by extending such a strap around the tree to thereby secure the upper end of the ladder stand 10 to the tree. The ladder stand 10 may also include a folding footrest 32. Although, with use of the ladder stand stabilizing device of the present invention, it may not be necessary to secure the upper end of the ladder stand 10 to the tree 12 or a similar structure, added stability and security for the ladder stand, when erected, is provided by such attachment as described above.

A critical phase of erecting or taking down the ladder stand 10 is providing for attachment or disconnection of the upper end of the ladder stand with respect to the tree 12. With prior art ladder stands, the initial ascent or final descent of the ladder rungs by the person on the ladder stand is a hazardous experience in that the ladder stand may tend to pull away from the tree or post if proper balance is not maintained tending to keep the ladder stand engaged with the tree or post. However, the ladder stand 10 is provided with an improved stabilizing device, generally designated by the numeral 34, which, when placed in use and secured to the ladder stand, minimizes the chance of the ladder stand tilting away from the tree 12 at any time and thus provides stability for the ladder stand.

Figure 3:
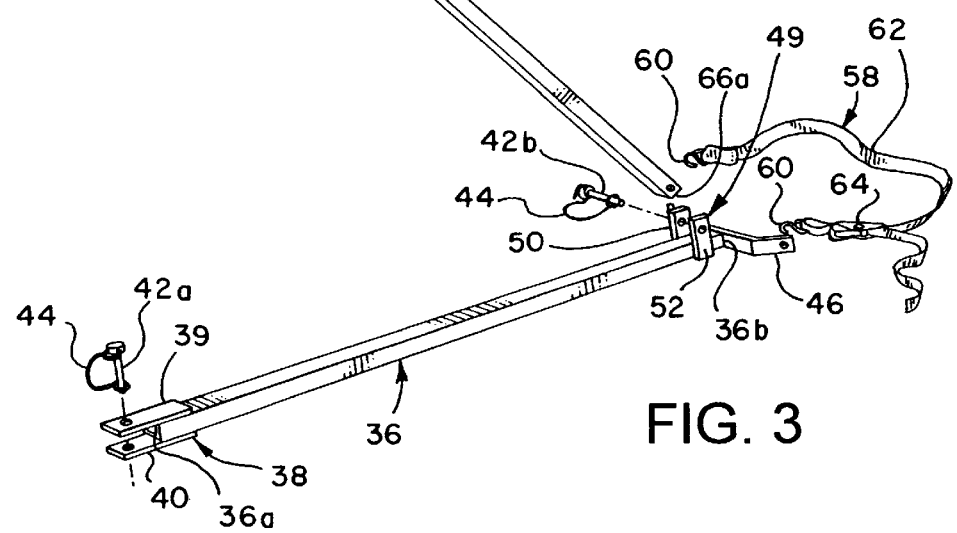
FIG. 3 is an exploded perspective view of the ladder stand stabilizing device shown in FIGS. 1 and 2.
Figure 5:
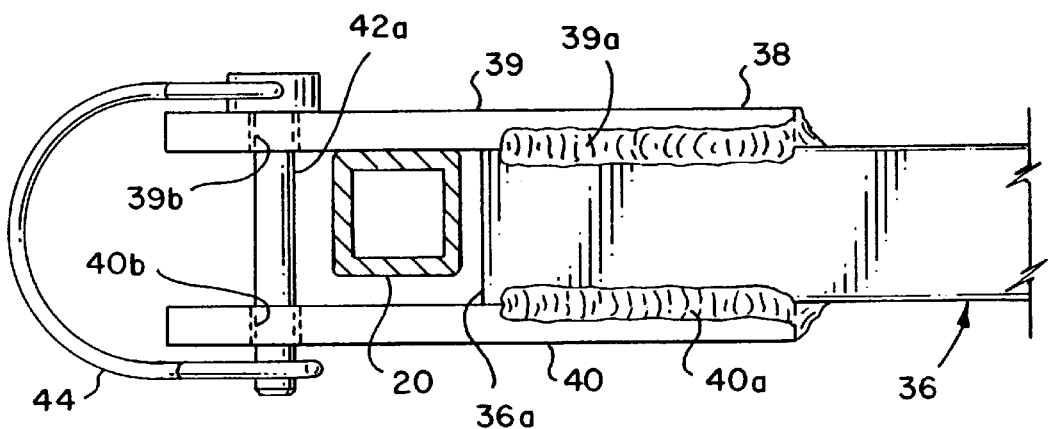
FIG. 5 is a view similar to FIG. 4 showing the connection between the other of the two struts of the stabilizing device to a lower rung of a ladder stand.

As shown in FIGS. 1 and 3, the ladder stand stabilizing device 34 is advantageously characterized by a first elongated, substantially straight, tubular strut 36 having a connector comprising a clevis 38 formed at a distal end thereof by opposed plate-like members 39 and 40. The clevis members 39 and 40 may be fabricated of suitable metal plate members welded to the distal end 36a of the strut 36, as indicated in FIG. 5, at welds 39a and 40a. As also shown in FIG. 5, the clevis members 39 and 40 are provided with aligned bores 39b and 40b for receiving a commercially available clevis retaining pin 42a having a resiliently deflectable somewhat C-shaped retainer member 44, well known to those of ordinary skill in the art, connected thereto for retaining the clevis pin 42a in a working position projecting through the bores 39b and 40b, as shown.

Figure 2:
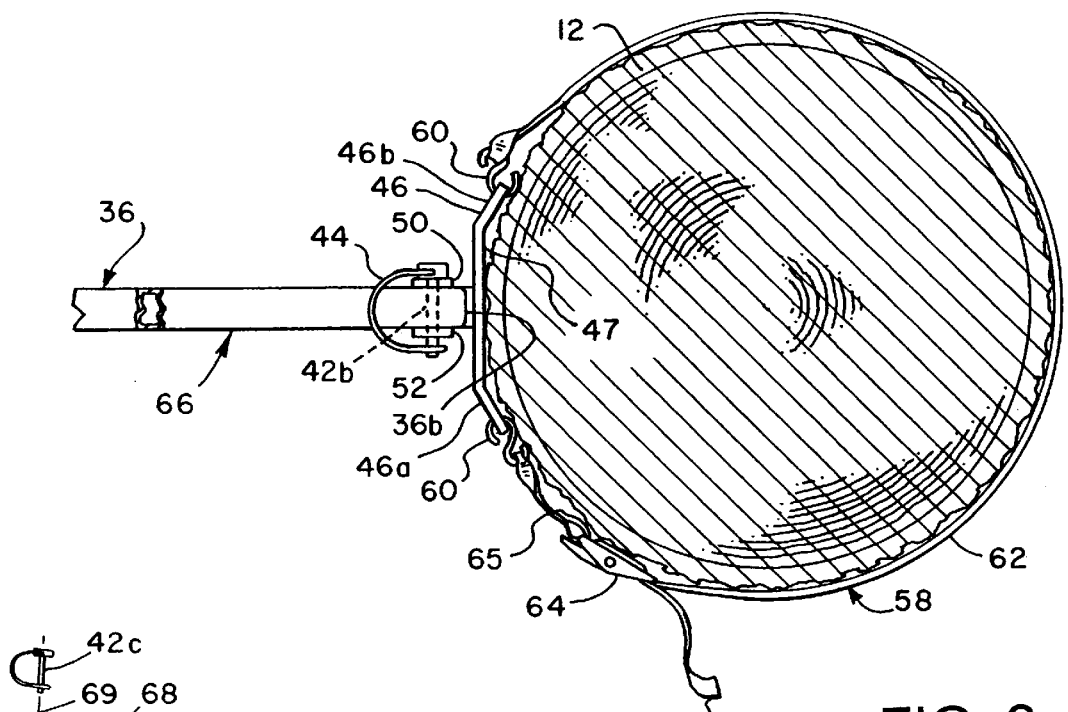
FIG. 2 is a view taken generally from the line 2—2 of FIG. 1.
Figure 6:
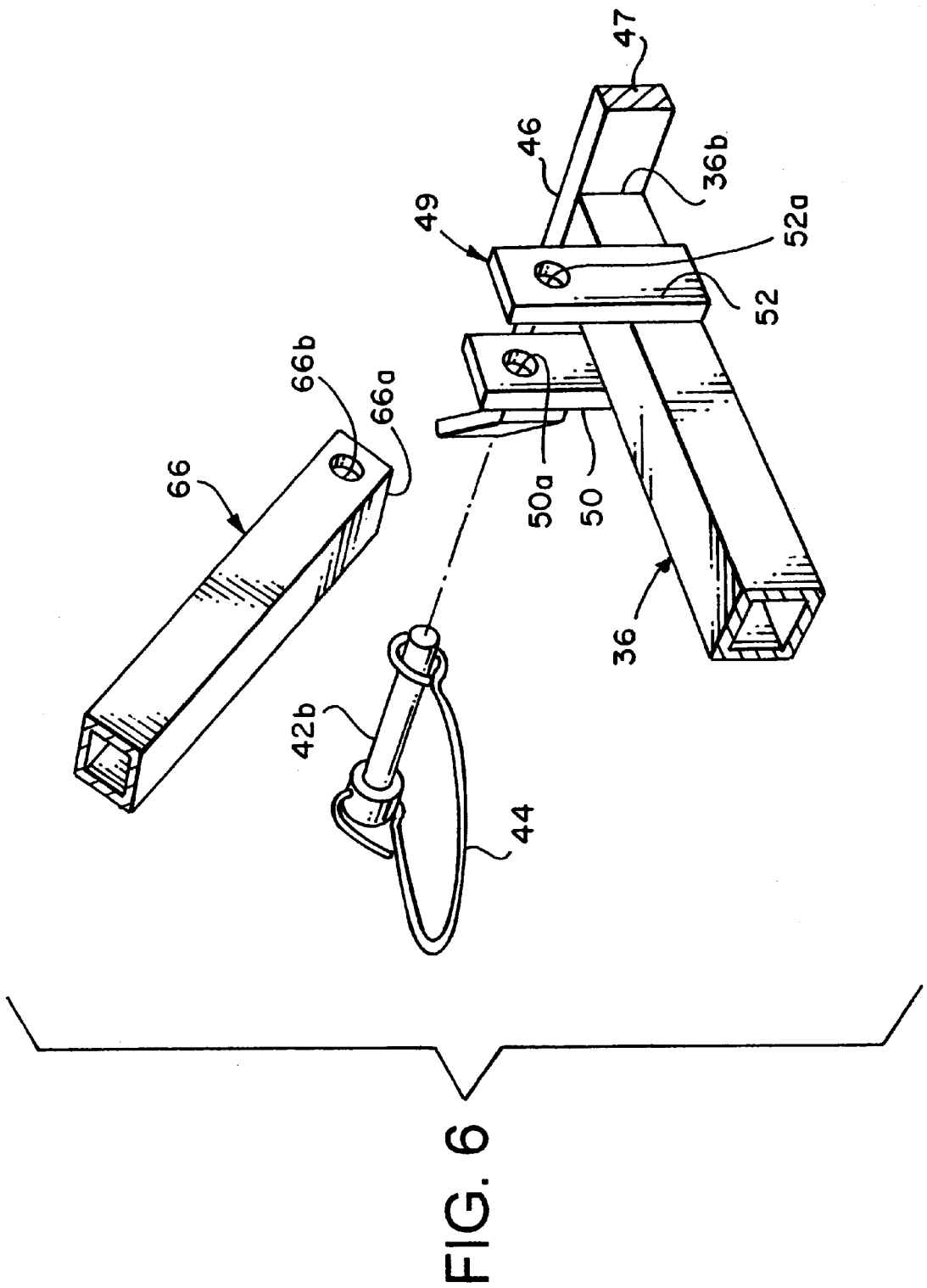
FIG. 6 is a detail view of the base of the stabilizing device showing structure for connection of the stabilizing struts to each other.

Referring further to FIGS. 1 through 3, the device 34 includes a rigid base member 46 suitably secured, such as by welding, to the opposite end 36b of the strut 36. The base member 46 comprises a formed metal strap which is at least partially bent at opposite ends 46a and 46b to form a somewhat concave tree or post engaging surface 47 to provide stable engagement with the outer surface of a tree or post, as shown in FIG. 2. As further shown in FIGS. 2, 3 and 6, the stabilizing device 34 includes a second connector comprising a clevis 49 which includes spaced-apart upwardly extending clevis members 50 and 52 secured to the strut 36 adjacent the end 36b and provided with aligned bores 50a and 52a, FIG. 6, for receiving a second clevis pin 42b therein, as shown in FIGS. 2 and 3. The clevis pin 42b, which is cooperable with the clevis members 50 and 52, is also provided with a pin retainer member 44.

Figure 4:
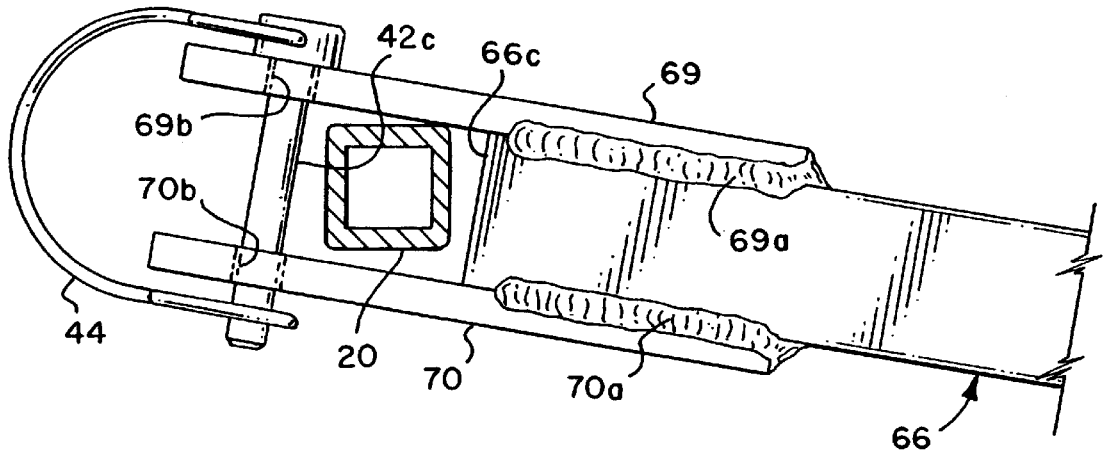
FIG. 4 is a detail view showing the connection of one of the struts to a rung of a ladder stand.

The base 46 is adapted to be secured to the tree 12, or a similar structure, by an elongated flexible strap 58, FIGS. 1 through 3, which is adapted to be secured to opposite ends of the base member 46, as shown in FIG. 2, by opposed hooks 60. The strap assembly 58 includes a first elongated strap member 62 extending from a hook 60 substantially around the tree 12 and secured to a buckle 64. The strap assembly 58 includes a second, substantially shorter, strap member 65, FIG. 2, secured to the buckle 64 and to the other hook 60. One end 62a of strap 62 is trainable through the buckle 64, which may be a self-locking tensioning-type buckle of one of several types well known to those of ordinary skill in the art, for securing and tightening a flexible strap. Other means well known to those of ordinary skill in the art may be used to secure the strut base member 46 to the tree 12 or a similar structure. The stabilizing device 34 is further characterized by a second elongated strut 66 having a first distal end 66a provided with a transverse bore 66b therein, FIG. 6, for receiving the clevis pin 42b when the strut distal end is disposed in clevis 49 and the pin projects through the aforementioned bores 50a and 52a in the levis members 50 and 52 to pivotally connect the strut 66 to the strut 36 at the base 46. The strut 66 is provided with an arcuate section 66d adjacent its opposite end 66c. Strut end 66c has secured thereto a connector formed by a clevis 68 including opposed clevis members 69 and 70 which are preferably welded to the strut 66 at welds 69a and 70a, FIG. 4. Clevis members 69 and 70 have aligned bores 69b and 70b adapted to receive a third clevis pin 42c, also provided with a suitable pin retainer member 44. As also shown in FIG. 4, the strut end 66c is adapted to be connected to a rung 20 of the ladder stand 10 spaced substantially from the rung to which the strut 36 is connected, typically four or five rungs vertically spaced from a lower rung to which the strut 36 is connected, as shown in FIG. 1.

Accordingly, the strut 66 is connected at one end to the strut 36 at or directly adjacent the base 46 and is connected to the ladder stand 10 at a point spaced from the point of connection of the strut 36 to the ladder stand. In this way, the ladder stand stabilizing device 34 is particularly advantageous for stabilizing the ladder stand 10 against tilting movement away from a tree or post, such as the tree 12 during an initial or any subsequent ascent of the ladder stand by a person attempting to secure the ladder stand at the distal ends 26 and 28 to the tree 12, or if the ladder stand is to be left unsecured at its upper end for any reason, including during a final descent and removal of the ladder stand from the tree. Due to the arcuate section 66d of the strut 66, the strut 66 remains in a substantially stand-off position from the vertical ladder section 14 of the ladder stand 10 and minimizes interference with a person's feet when placed on the rungs 20. Moreover, by providing the multiple strut stabilizing device 34 configured such that the struts 36 and 66 are, essentially, connected to each other at the strut ends which are secured to the tree by removable clevis pins, the stabilizing device may be conveniently assembled and disassembled or folded to allow the struts 36 and 66 to be disposed adjacent to each other for ease of transport and storage.

In a typical operation to connect the stabilizing device 34 to the ladder stand 10, the strap assembly 58 is secured to the base 46, the base 46 is placed adjacent to a tree or post, such as the tree 12, and the strap assembly 58 wrapped around the tree and secured at the buckle 64 to connect the base to the tree. The strut 36 may then be connected to a lower rung of the ladder stand 10 by placing a rung 20 in the clevis 38 and attaching the pin 42a to the clevis members 39 and 40, as shown in FIG. 5. The strut 66 may have previously been secured to the strut 36 with the end 66a placed between the members 50 and 52 of clevis 49 and secured thereto by the pin 42b. In any event, once the strut 66 is connected to the strut 36 and/or the base 46, the opposite end of the strut 66 may be secured to a rung 20 of the ladder stand 10 at the clevis 68 and secured thereto with clevis pin 42c. The process of disassembly of the stabilizing device 34 from the ladder stand 10 may be carried out in the reverse order of that just described.

Figure 7:
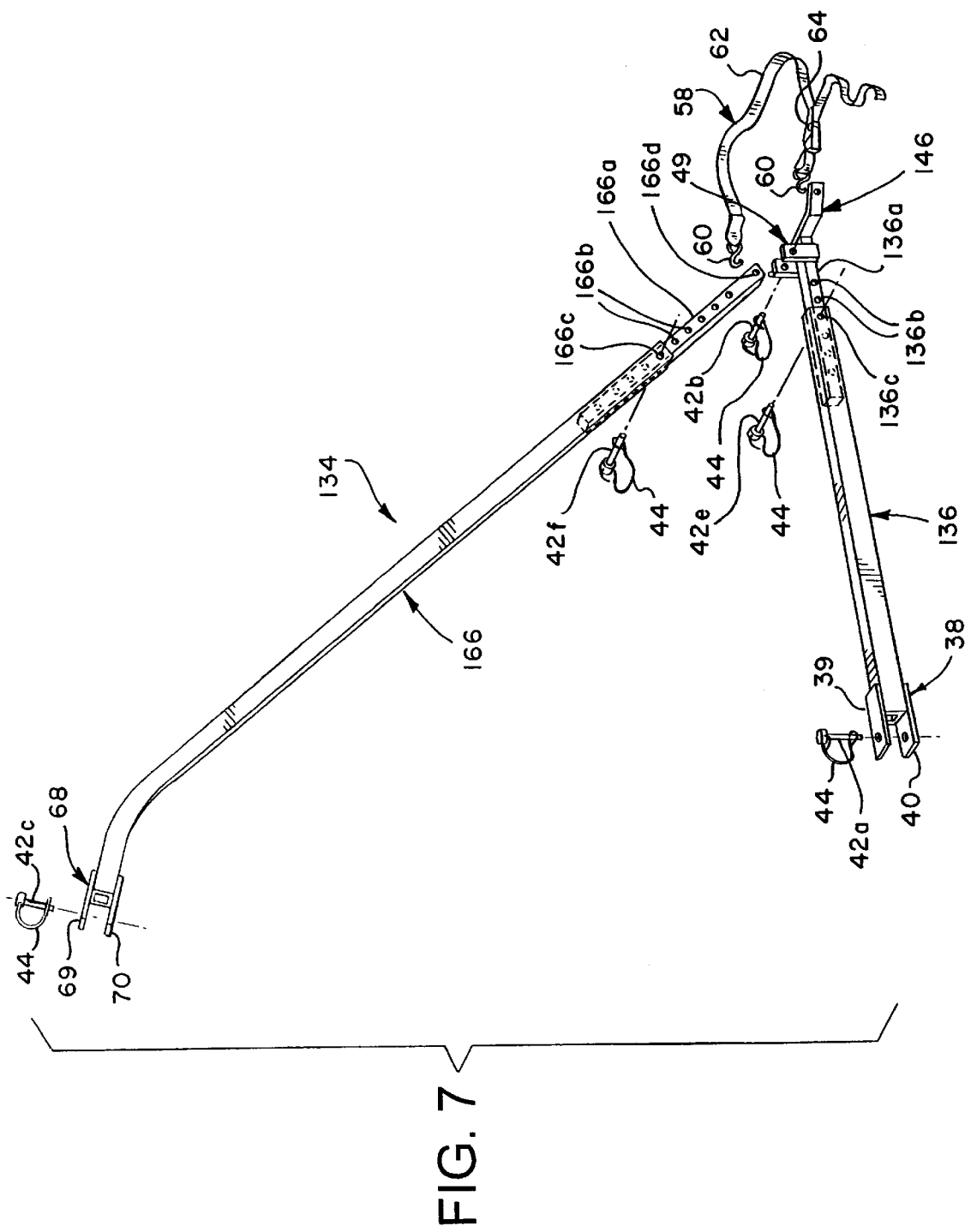
FIG. 7 is an exploded perspective view of a first alternate embodiment of a ladder stand stabilizing device in accordance with the present invention.

Referring now to FIG. 7, an alternate embodiment of a ladder stand stabilizing device in accordance with the invention is illustrated and generally designated by the numeral 134. The stabilizing device 134 includes elongated tubular struts 136 and 166 which are similar to the struts 36 and 66 except they may be of shorter overall lengths, respectively. Otherwise the struts 136 and 166 are substantially like the struts 36 and 66. In the stabilizing device 134 a base 146 is provided with a fixed strut extension member 136a which is preferably a square cross-section tube which is dimensioned to fit within the square cross-section tube of the strut 136 in telescoping relationship. Spaced apart sets of pin receiving holes 136b are formed in the strut extension 136a and are cooperable with a pin receiving hole 136c formed in the strut 136 adjacent the strut end which is opposite the clevis 38 for alignment with one of the pin receiving holes 136b whereby a clevis pin 42e may project through the cooperating sets of holes to lock the strut 136 to the base 146 in a selected telescoped position.

Referring further to FIG. 7, the strut 166 is also provided with a square cross-section tubular extension member 166a having a plurality of spaced apart pin receiving holes 166b formed therein and operable to receive a retainer clevis pin 42f in a selected telescoped position in strut 166 to effectively vary the length of strut 166. Strut 166 includes transverse hole means 166c adjacent the end of the strut opposite the end which includes clevis 68 for receiving pin 42f. Strut extension member 166a is also adapted to be connected to a clevis 49 formed on the strut extension member 136a in a manner similar to that wherein the strut 66 is secured to the clevis 49 of strut 36 for the stabilizing device 34.

Accordingly, the stabilizing device 134 is substantially like the stabilizing device 34 except that the effective lengths of the struts 136 and 166 can be varied as required to stabilize a ladder stand having a longer or shorter laterally extending or stand off portion, and including ladder stands or ladders which do not have any lateral extending portion. Still further, the effective length of the struts 136 and 166 can be varied to accommodate a desired angle of inclination of a ladder stand to which the stabilizing device 134 is connected. Accordingly, the stabilizing device 134 is somewhat more versatile than the device 34 and can accommodate different types of ladder stands, perhaps more easily. In all other respects, the ladder stand stabilizing device 134 is substantially like the device 34.

The construction and operation of the ladder stand 10 including, in particular, the ladder stand stabilizing devices 34 and 134, is believed to be readily understandable to those of ordinary skill in the art from the foregoing description. The stabilizing devices 34 and 134 may be fabricated of conventional engineering materials used for ladder type structures and the like. In particular, the struts 36, 136, 66 and 166 may be fabricated of square cross-section aluminum tube having a nominal cross-section diameter of about 1.0 inch and a wall thickness of about 0.063 inches. The clevis members may be fabricated of 1.0 inch by 0.25 inch aluminum plate. Moreover, the connections of the struts for the device 34 at the base 46 may be carried out in various ways. For example, the strut 66 may be fixed to the base member 46 and strut 36 releasably connected to the strut 66 or the base member, if desired. Preferably, the stabilizing devices 34 and 134 are painted in an olive drab or suitable camouflage color when used in conjunction with ladder stands for hunting purposes.

Although preferred embodiments of the invention have been described in detail herein, those skilled in the art will recognize that various substitutions and modifications may be made to the invention without departing from the scope and spirit of the appended claims.

What is claimed is:

1. A stabilizing device for a ladder stand comprising a ladder section including spaced-apart elongated stringers and plural spaced-apart ladder rungs extending between said stringers, respectively, and operable to be rested against a tree or post with said rungs spaced-apart substantially vertically one above the other, said stabilizing device comprising:

a first, generally elongated strut including a first connector for connecting one end of said first strut to a lower rung of said ladder stand between said stringers;

a base member engageable with said tree or post at a point substantially below an uppermost rung of said ladder stand when said ladder stand is rested against said tree or post;

means for securing said base member to said tree or post at said point substantially below an uppermost rung of said ladder stand;

a second, generally elongated strut including a second connector for connecting one end of said second strut to a ladder rung between said stringers above the rung to which said first strut is to be connected when said ladder stand is rested against said tree or post; and the opposite ends of said struts being connected to said base member for stabilizing said ladder stand to resist said ladder stand pulling away from said tree or post at an upper end of said ladder stand during an ascension thereof.

2. The stabilizing device set forth in claim 1 wherein:
said second strut includes an extension member for selectively varying the effective length of said second strut between said second connector and said base member.

3. The stabilizing device set forth in claim 1 wherein:
said base member includes opposed ends defining a somewhat concave surface for engagement with said tree or post.

4. The stabilizing device set forth in claim 1 wherein:
said means for securing said base member comprises an elongated flexible strap including means for tightening said strap to attach said base member to said tree or post.

5. The stabilizing device set forth in claim 1 wherein:
said second strut is pivotally connectable to said first strut at said base member.

6. The stabilizing device set forth in claim 5 wherein:
said first strut includes a clevis secured thereto for receiving a second end of said second strut and a levis pin for retaining said second end of said second strut pivotally connected to said first strut.

7. The stabilizing device set forth in claim 1 wherein:
said first connector comprises a clevis at one end of said first strut for receiving said lower rung of said ladder stand and a removable clevis pin adapted to be secured to said clevis of said first strut for retaining said first strut connected to said lower rung of said ladder stand.

8. The stabilizing device set forth in claim 1 wherein:
said second connector comprises a clevis at one end of said second strut for receiving a rung of said ladder stand and a removable clevis pin operable to be engaged with said clevis of said second strut for retaining said second strut connected to said ladder stand.

9. The stabilizing device set forth in claim 1 wherein:

said second strut comprises a bent section between opposite ends of said second strut.

10. The stabilizing device set forth in claim 1 wherein:

said first strut includes an extension member operable to selectively vary the effective length of said first strut between said first connector and said base member.

11. A stabilizing device for a ladder stand comprising a ladder section including spaced-apart elongated stringers and plural spaced-apart ladder rungs extending between said stringers and operable to be rested against a tree or post with said rungs disposed substantially one above the other, said stabilizing device comprising:

a first, generally elongated strut and a first connector for releasably connecting one end of said first strut to a lower rung of said ladder stand between said stringers;

a second, generally elongated strut and a second connector for releasably connecting one end of said second strut to a ladder rung between said stringers and above the rung to which said first strut is to be connected;

a base member for engagement with said tree or post at a point below said rung of said ladder stand to which said one end of said second strut is to be connected;

means for connecting said base member to said tree or post; and said base member being operably connected to said struts at opposite ends thereof, respectively, for retaining said struts operably connected to said tree or post for stabilizing said ladder stand during an ascension thereof.

12. The stabilizing device set forth in claim 11 wherein:

said means for connecting said base member to said tree or post comprises an elongated flexible strap including means for tightening said strap to attach said base member to said tree or post.

13. The stabilizing device set forth in claim 11 wherein:

said second strut is pivotally connectable to said first strut at said base member.

14. The stabilizing device set forth in claim 13 wherein:

said first strut comprises a clevis secured thereto for receiving said opposite end of said second strut and a releasable clevis pin for retaining said opposite end of said second strut pivotally connected to said first strut.

15. A stabilizing device for a ladder stand comprising a ladder section including plural spaced-apart ladder rungs and operable to be rested against a tree or post with said rungs spaced apart substantially vertically one above the other, said stabilizing device comprising:

a first, generally elongated strut including a first connector for releasably connecting one end of said first strut to said ladder stand at a first attachment point;

a base member operable for engagement with said tree or post at a point substantially below an uppermost rung of said ladder stand when said ladder stand is rested against said tree or post;

means for securing said base member to said tree or post;

a second, generally elongated strut including a second connector for releasably connecting one end of said second strut to said ladder stand at a selected second attachment point along the length of said ladder stand and spaced from and above said first attachment point when said ladder stand is rested against said tree or post; and said struts converging toward each other at their respective opposite ends when connected to said ladder stand, said struts being pivotally connected to each other at their respective opposite ends and operably connected to said base member for stabilizing said ladder stand to resist pulling away from said tree or post at an upper end of said ladder stand during an ascension thereof.

16. A stabilizing device for a ladder stand comprising a ladder section including spaced-apart elongated stringers and plural spaced-apart ladder rungs extending between said stringers, respectively and operable to be rested against a tree or post, said stabilizing device comprising:

a first, generally elongated tubular strut;

a first clevis connector for releasably connecting one end of said first strut to a lower rung of said ladder stand between said stringers;

a second, generally elongated tubular strut;

a second clevis connector for releasably connecting one end of said second strut to a ladder rung between said stringers at a rung spaced from and above the rung to which said first strut is connected;

a base member for engagement with said tree or post, said base member being connectable to a flexible strap for securing said base member to said tree or post, said base member being connected to an opposite end of at least one of said struts at a point below said rung to which said one end of said second strut is to be connected; and a third connector for connecting the opposite end of one of said struts to the other of said struts adjacent said base member.

17. The stabilizing device set forth in claim 16 wherein:

said third connector comprises a clevis secured to said first strut for receiving an opposite end of said second strut and a clevis pin for retaining said opposite end of said second strut pivotally connected to said first strut.

18. The stabilizing device set forth in claim 16 wherein:

said second strut comprises a bent section between opposite ends of said second strut.

\* \* \* \* \*

UNITED STATES PATENT AND TRADEMARK OFFICE
CERTIFICATE OF CORRECTION

PATENT NO.   : 6,199,660 B1
DATED        : March 13, 2001
INVENTOR(S)  : Paul H. Meeks It is certified that error appears in the above-identified patent and that said Letters Patent is hereby corrected as shown below:

Column 4,
Line 14, change "levis" to -- clevis --.

Column 6,
Line 52, change "levis" to -- clevis --.

Signed and Sealed this

Fourth Day of June, 2002

*Attest:*

*Attesting Officer*

JAMES E. ROGAN
*Director of the United States Patent and Trademark Office*